United States Patent [19]

Tsai et al.

[11] Patent Number: 4,489,683
[45] Date of Patent: Dec. 25, 1984

[54] ENGINE WITH CRANK MOUNTED BALANCER FOR SECONDARY SHAKING FORCES

[75] Inventors: Lung-Wen Tsai, Troy; Thomas J. Johnson, Leonard, both of Mich.

[73] Assignee: General Motors Corporation, Detroit, Mich.

[21] Appl. No.: 373,350

[22] Filed: Apr. 30, 1982

[51] Int. Cl.³ .............................................. F16F 15/26
[52] U.S. Cl. ......................... 123/192 B; 123/192 R; 74/603; 74/604
[58] Field of Search .................. 123/192 B, 192 R; 74/603, 604; 464/180

[56] References Cited

U.S. PATENT DOCUMENTS

| | | | |
|---|---|---|---|
| 1,593,564 | 7/1926 | Boughton | 74/604 |
| 1,785,338 | 12/1930 | Coleman | 74/604 |
| 1,950,350 | 3/1934 | Boland | 74/604 |
| 2,183,467 | 12/1939 | Sarazin | 74/604 |
| 2,214,921 | 9/1940 | Crisnell | 74/604 |
| 3,511,110 | 5/1970 | Grieve | 123/192 B |
| 3,667,317 | 6/1972 | Hillingrathner | 123/192 B |
| 3,990,325 | 11/1976 | Bueren | 123/192 B |

FOREIGN PATENT DOCUMENTS

| | | | |
|---|---|---|---|
| 487783 | 12/1929 | Fed. Rep. of Germany | 74/604 |
| 482336 | 3/1938 | United Kingdom | 74/604 |
| 543964 | 3/1942 | United Kingdom | 74/604 |
| 972544 | 10/1964 | United Kingdom | 123/192 R |

Primary Examiner—Ira S. Lazarus
Assistant Examiner—R. S. Bailey
Attorney, Agent, or Firm—Robert J. Outland

[57] ABSTRACT

A crankshaft mounted secondary shaking force balancer for multicylinder engines and the like in which eccentrically rotating balance weights carried on the crankshaft and arranged for substantial primary balance are combined in oppositely rotating groups of weights driven by stationary ring or sun gears and associated planetary gears to provide coacting rotating forces that combine to apply directly to the crankshaft a secondary shaking force reciprocating at twice crankshaft speed and available to balance equivalent oppositely directed shaking forces developed by the crankshaft connected moving components of the engine.

11 Claims, 6 Drawing Figures

4,489,683

ENGINE WITH CRANK MOUNTED BALANCER FOR SECONDARY SHAKING FORCES

TECHNICAL FIELD

This invention relates to engine balancers and, more particularly, to secondary shaking force balancers having rotatable flyweights carried by the crankshaft and arranged for primary balance, while applying reciprocating secondary shaking forces to the crankshaft to balance equivalent forces caused by components connected with the crankshaft and thereby reduce bearing loads as well as vibration.

BACKGROUND

It is known in the art relating to reciprocating piston machines, and in particular multicylinder piston engines, to provide suitable auxiliary balancing devices to counterbalance unbalanced primary and secondary forces applied to the crankshaft by reciprocating components associated with the various engine cylinders. While some engine cylinder and crank arrangements provide inherent balancing of primary and secondary vibrations, many common arrangements result in unbalanced forces which cannot be offset by weights added to the crankshaft.

For example, a conventional crank arrangement for a four cylinder in-line piston engine provides substantial balance of primary forces and primary and secondary couples but yields a resultant unbalanced secondary shaking force. This shaking force reciprocates at twice crankshaft speed in the plane of the cylinders and crankshaft and in a direction perpendicular to the crankshaft axis, being centered longitudinally midway between the cylinders and, generally, at the center main bearing bulkhead supporting the crankshaft.

Such unbalanced secondary shaking forces may be balanced, if desired, by a balancing mechanism properly located having one or more pairs of counterweights rotated in opposite directions at twice crankshaft speed to provide a reciprocating shaking force directed oppositely to the unbalanced secondary shaking force of the engine. Such "add on" balancers generally require additional space, in the engine housing or external to the engine, with appropriate driving mechanisms which may add undesired complexity and weight to the engine construction as well as requiring additional space in the engine compartment.

SUMMARY OF THE INVENTION

The present invention provides a novel shaking force balancer for internal combustion engines which is efficient in both the use of space and the addition of weight to a conventional multicylinder engine. The balancer includes efficiently arranged oppositely rotating pairs of balance weights carried in opposed eccentric locations of the crankshaft. The weights rotatably driven through appropriate planetary gearing carried by the crankshaft and the engine crankcase. The balance weights are arranged in oppositely rotated groups of weights which combine to provide a resultant unbalanced shaking force reciprocating at twice crankshaft speed and directed so as to oppose an equivalent unbalanced secondary shaking force of the engine.

In preferred embodiments, the rotating balance weights are located in positions on the crankshaft adjacent one or more of the engine bulkheads at locations commonly utilized for one or more of the crankshaft supporting main bearings. Any increase in bearing loads due to reducing the number of main bearings must, of course, be carried by the remaining engine main bearings, however the maximum main bearing forces may be reduced by balancing forces generated by the balance weights and applied directly to the engine crankshaft.

These and other features and advantages of the present invention will be more fully understood from the following description of certain preferred embodiments taken together with the accompanying drawings.

BRIEF DRAWING DESCRIPTION

DETAILED DESCRIPTION

Figure 1:
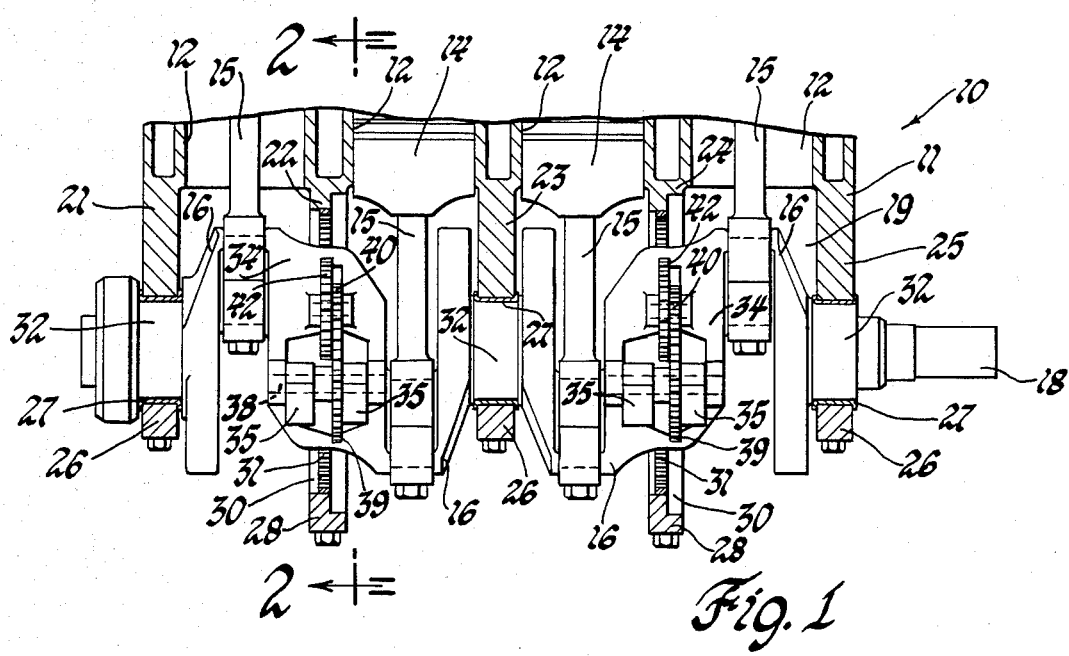
FIG. 1 is a partial cross-sectional view showing pertinent portions of a four cylinder inline internal combustion engine having balancing means in accordance with the invention.
Figure 2:
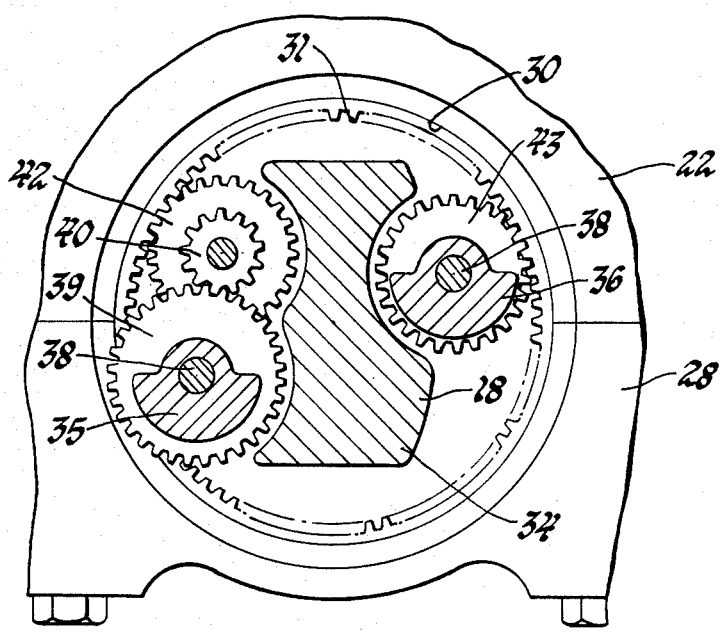
FIG. 2 is an enlarged fragmentary cross-sectional view taken generally in the plane indicated by the line 2—2 of FIG. 1.

Referring first to FIGS. 1 and 2 of the drawings, there are shown pertinent portions of an internal combustion engine generally indicated by numeral 10. Engine 10 includes a cylinder block 11 defining four in-line cylinders 12 in each of which is disposed a reciprocable piston 14. Pistons 14 are connected by connecting rods 15 to the four eccentric throws 16 of a crankshaft 18 carried for rotation in the lower portion of the cylinder block casting which partially defines a crankcase 19.

The engine crankcase is provided with five main bulkheads 21-25. The alternate bulkheads 21, 23 and 25 receive bearing caps 26 that support bearings 27 on which the crankshaft is journaled. The intermediate bulkheads 22 and 24 are provided with special bearing caps 28 which define, with their respective bulkheads, enlarged openings 30 each having an internal gear 31 formed around its periphery and defined by or within its respective bulkhead and bearing cap assembly for a purpose to be subsequently described.

The crankshaft 18, in addition to four longitudinally spaced throws 16, includes three journals 32 located near the ends and at the center of the crankshaft and received in the bearings 27 within the supporting bulkheads 21, 23 and 25 of the engine crankcase. Longitudinally spaced between each pair of adjacent journals 32 are two crankshaft throws 16 having opposite eccentricities from the crankshaft axis. Between these throws and aligned with the locations of crankcase bulkheads 22 and 24, the crankshaft is provided with enlarged portions 34 at which are carried portions of the balancer means of the present invention.

The balancer means include, at each location, a pair of balance masses or weights 35, 36 mounted on axle shafts 38 for rotation on axes parallel with and oppositely equidistantly displaced from the crankshaft axis and coplanar with one another and with the crankshaft axis. Each balance weight may, as in the present instance, be made up of more than one mass element.

At each location, balance weight 35 is rotatably drivable by a gear train, including a gear 39 to which the weight is attached, a gear 40 which engages gear 39 with a 3 to 1 reverse reduction ratio and a planetary gear 42 connected with and rotatable upon the same axis as gear 40. Each gear 42 engages the ring gear 31 of its respective bulkhead and is sized at one-third the pitch diameter of the ring gear. Balance weight 36 is connected to and rotatable with a second planetary gear 43 which also engages the ring gear 31 and is sized with a pitch diameter equal to one-third that of the ring gear.

In operation of this arrangement, balance weights 35 at each location will, upon rotation of the crankshaft, be carried around therewith and, by action of their gear trains, be rotatably driven around their respective axes in the direction of crankshaft rotation but at a rotational speed with respect to the engine crankcase of twice crankshaft speed. On the other hand, the weights 36 at each location will be rotatably driven around their respective axes in a direction opposite to that of crankshaft rotation and at a speed relative to the engine crankcase of twice the crankshaft speed. Preferably all of the weights 35 and 36 are of equal mass and are displaced in the same directions at the points of crankshaft rotation necessary to exactly oppose the secondary shaking forces inherently developed in the four cylinder in-line engine arrangement described. Thus the balance weights 35 at both locations rotate together at twice the crankshaft speed in the direction of crankshaft rotation and the balance weights 36 at both locations rotate together at twice crankshaft speed in directions opposite to the direction of crankshaft rotation.

The resultant effect is that balancing reciprocating forces are developed by the balance weights at two locations equidistant from the center of the engine. These forces are timed to oppose the unbalanced secondary shaking force of the engine so as to provide a combined balancing secondary shaking force to offset the engine shaking force. In this arrangement, it is seen that the weights 35 at each location define one group of two weights, each rotating in the same direction while the weights 36 at each location define a second group of two weights, each rotating in the same direction, opposite to that of the weights 35 of the first group.

Figure 3:
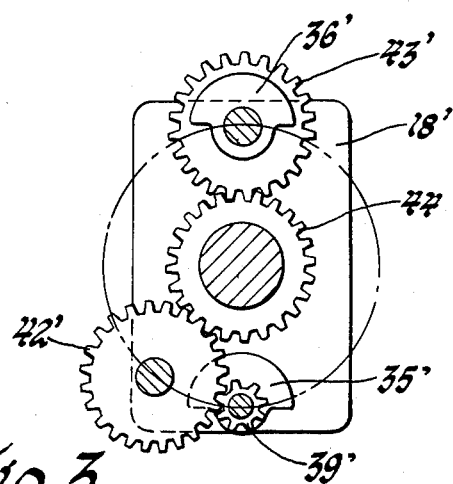
FIG. 3 is a cross-sectional view showing an alternative embodiment of balancer arrangement in accordance with the invention.

Referring now to FIG. 3 of the drawings, there is shown an alternative arrangement of balancing mechanism wherein crankshaft 18' carries planetary gears 42' 43'. These engage and are driven by a stationary sun gear 44 which may be carried in any suitable fashion by the adjacent engine bulkhead and has a pitch diameter equal to that of the planetary gears. Gear 43' carries a balance weight 36' for rotation in the direction of crankshaft rotation at twice crankshaft speed. Gear 42' drives a gear 39' which is one-third the pitch diameter of gear 42' and carries a balance weight 35' for rotation at twice crankshaft speed opposite to the direction of crankshaft rotation. Balance weights 35' and 36' are rotatable on axes which are oppositely equidistantly displaced from the crankshaft axis and are thus coplanar with one another and with the axis of the crankshaft as in the previously described embodiment.

Operation of the arrangement is essentially the same as that previously described with the exception that the planetary gears are driven by a sun gear rather than a ring gear and thus the directions of rotation of the planetary gears are opposite to that of the first described embodiment.

It should be recognized that, with the balancer arrangements previously described, the oppositely rotating balance weights at each location will introduce torsional vibrations into the crankshaft. These may be offset within the crankshaft itself by properly arranging the balance weights and driving gears at the two spaced locations so that the torques introduced at one location are counteracted by those produced at the other. Alternatively, it is possible to provide other balancer arrangements in which opposing torques are developed within the balancer unit so that they are not distributed along a substantial length of the crankshaft. Such an arrangement is shown, for example, in the embodiment of FIG. 4 which is arranged to be located in an engine at the center bulkhead in place of the usual center main bearing, thus leaving four outer main bearings available to support the crankshaft.

Figure 4:
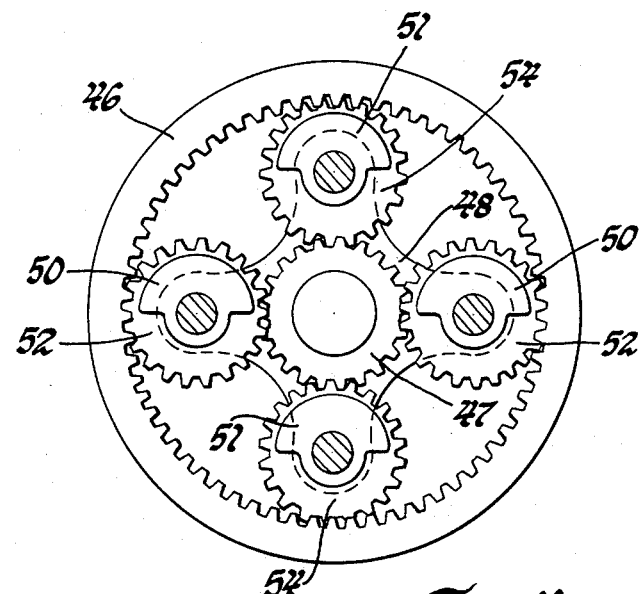
FIG. 4 is a cross-sectional view showing still another embodiment of balancer arrangement in accordance with the invention.

Referring to FIG. 4, there is shown a ring gear 46 and a sun gear 47 which are adapted to be grounded, or fixedly mounted, to a relatively stationary object such as the central bulkhead of a four cylinder in-line engine. Gears 46 and 47 are coaxial and have relative pitch diameters of three to one. The balancer of FIG. 4 further includes a carrier 48 which is preferably the engine crankshaft or a component attached thereto. Carrier 48 supports two pairs of balance weights 50 and 51 which are rotatable on equiangularly spaced axes parallel with and equidistant from the crankshaft axis, the weights of each pair being oppositely displaced from the crankshaft axis and thereby coplanar with one another and with the crankshaft axis.

Weights 50 are rotatably driven at a speed relative to ground of twice the carrier speed in a direction opposite to carrier rotation by connection with coaxial planetary gears 52 which engage the ring gear 46 and have pitch diameters one-third that of the ring gear. Weights 51 are rotatably driven at a speed relative to ground of twice carrier speed in the direction of carrier rotation by connection with coaxial planetary gears 54 which engage the stationary sun gear 47 and have pitch diameters equal to that of the sun gear.

All four balance weights are of equal mass and the weights of each pair are displaced in the same direction from their respective axes. Thus the primary forces are substantially balanced and the eccentric masses of each pair combine to provide rotating unbalance forces. These forces of the two pairs in turn combine to provide a secondary reciprocating or shaking force oscillating at twice crankshaft speed which, upon proper orientation of the weights, is capable of balancing equivalent secondary shaking forces in an associated engine. The arrangement also develops counterbalancing torques on the carrier through the like motions of the weights of each pair on opposite sides of the crankshaft, thus balancing out the torques applied to the carrier by the individual weights.

Figure 5:
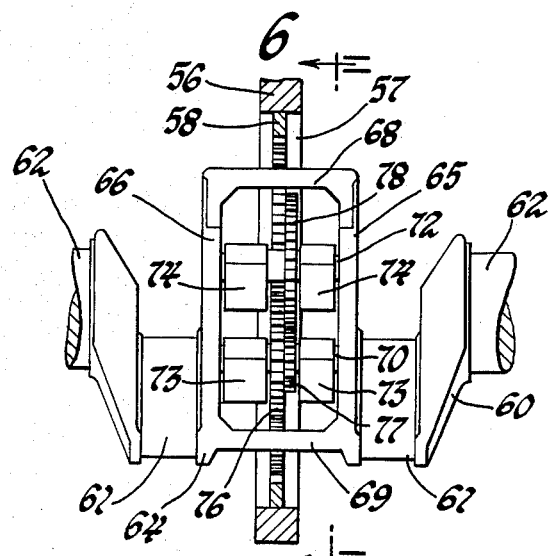
FIG. 5 is a fragmentary side view of a portion of the crank and balancer assembly of yet another alternative embodiment in accordance with the invention.
Figure 6:
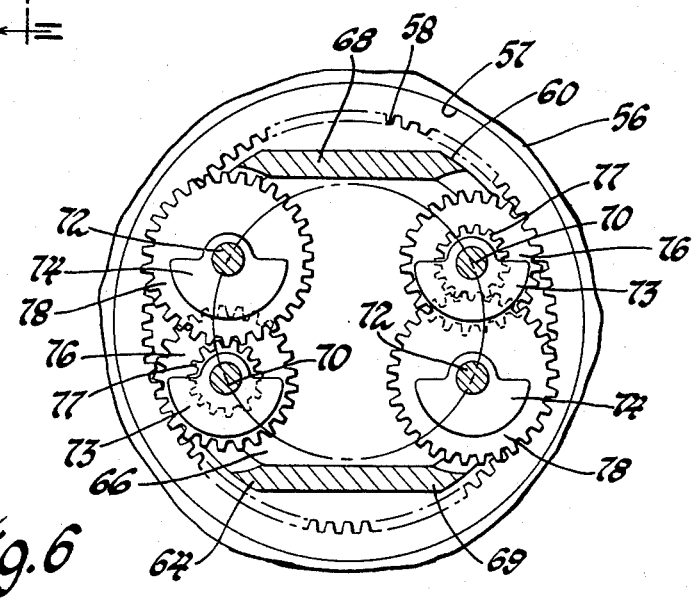
FIG. 6 is a cross-sectional view taken in the plane generally indicated by the line 6—6 of FIG. 5.

Referring now to FIGS. 5 and 6 of the drawings, there is shown another embodiment of balancer adapted for mounting at the central bulkhead of an in-line four cylinder engine and capable of providing secondary shaking force balancing without the addition of unwanted torsional vibrations to the crankshaft. In this embodiment, numeral 56 indicates the central bulkhead of the associated engine having an opening 57 in which there is located a fixed internal ring gear 58. A crankshaft 60, having a plurality of throws 61, is supported on journals 62 in the crankcase of the associated engine not otherwise illustrated.

Crankshaft 60 has an enlarged central portion 64 that extends through opening 57 and includes a pair of end walls 65, 66 interconnected by a pair of side walls 68, 69 extending longitudinally of the crankshaft on opposite sides of the crankshaft axis. Between the end walls 65, 66 there extend longitudinally two pairs of axle shafts 70, 72 centered on axes equidistant from the crankshaft axis with the axes of each pair being oppositely displaced from the crankshaft axis and thereby coaxial with one another and with the crankshaft axis. All of the axle shafts carry balance weights 73 or 74 of equal mass and the balance weights 73 or 74 of each opposed pair of weights are displaced in the same directions from their respective axes for rotation in like directions to provide the equivalent of a rotating mass centered at the crankshaft axis.

Opposed balance weights 73 are rotatably driven by planetary gears 76 engaging the ring gear 58, gears 76 being rotatable on axle shafts 70 and connected directly with weights 73. Gears 76 have pitch diameters one-third that of the ring gear 58 and thus drive the weights 73 at twice crankshaft speed with respect to the stationary ring gear and in the direction opposite that of crankshaft rotation. Opposed balance weights 74 are rotatably driven by gear trains consisting of small drive gears 77 coaxial with and driven by the planetary gears 76 and engaging driven gears 78 coaxial with and carrying the balance weights 74 and rotatable on axle shafts 72. The pitch diameters of the gears 77, 78 have a ratio of one to three so that balance weights 74 are rotated in the reverse direction from, and at one-third the speed of, balance weights 73 when considered with respect to the crankshaft. However, when the movement of the crankshaft itself is taken into account, the rotation of balance weights 74 with respect to the stationary ring gear 58 and the associated engine is twice crankshaft speed in the direction of crankshaft rotation, while balance weights 73 present equal and opposite rotation.

In operation, therefore, the torsionally and primarily balanced forces of opposed balance weights 73 combine with the oppositely rotating primarily and torsionally balanced forces of opposed balance weights 74 to provide a secondary shaking force reciprocating at twice crankshaft speed and available to offset the secondary shaking force of the associated four cylinder in-line engine or mechanism in which the balancer may be installed.

While the invention has been disclosed by reference to a number of preferred embodiments chosen for purposes of illustration, it should be recognized that numerous changes could be made within the spirit and scope of the inventive concepts disclosed. Accordingly, it is intended that the invention not be limited to the disclosed embodiments but that it have the full scope permitted by the language of the following claims.

The embodiments of the invention in which an exclusive property or privilege is claimed are defined as follows.

1. A multicylinder piston engine having a crankcase rotatably journaling a crankshaft therein for rotation on a longitudinal axis, said crankshaft having a plurality of axially spaced throws connectable with reciprocable pistons, associated with various engine cylinders, an even number of balance weights of equal mass carried by said crankshaft and arranged for eccentric rotation about axes parallel with and spaced equidistant from the crankshaft axis, said balance weights being arranged in pairs having rotational axes rotatable with the crankshaft and oppositely displaced from and coplanar with one another and the crankshaft axis to provide substantial primary balance of the balance weights about the crankshaft axis and said balance weights comprising diverse first and second groups having equal numbers of weights, and means for rotatably driving about their respective axes the weights of said first and second groups of balance weights in opposite directions of rotation at twice the crankshaft speed with respect to the crankcase, all of the weights of each group having the same eccentric orientation whereby the eccentric unbalances of said groups combine to provide a reciprocating secondary shaking force on the crankshaft for balancing opposed secondary shaking forces of equivalent value acting on the crankshaft during engine operation.

2. The engine of claim 1 wherein said means for rotatably driving the balance weights comprises planetary gears connected with said weights and driven by at least one of fixed external and internal gears.

3. The engine of claim 2 wherein said number of balance weights is four.

4. The engine of claim 3 wherein said four balance weights are each axially connected with a planetary gear and said weights and their associated gears are arcuately equally spaced about the crankshaft axis.

5. A multicylinder piston engine having a crankcase rotatably journaling a crankshaft therein for rotation on a longitudinal axis, said crankshaft having a plurality of axially spaced throws connectable with reciprocable pistons associated with various engine cylinders, an even number of balance weights of equal mass carried by said crankshaft and arranged for eccentric rotation about axes parallel with and spaced equidistant from the crankshaft axis, said balance weights being arranged in pairs having rotational axes rotatable with the crankshaft and oppositely displaced from and coplanar with one another and the crankshaft axis to provide substantial primary balance of the balance weights about the crankshaft axis and said balance weights comprising diverse first and second groups, each group including one of the weights of each of said pairs of weights, and means for rotatably driving about their respective axes the weights of said first and second groups in opposite directions of rotation at twice the crankshaft speed with respect to the crankcase, all of the weights of each group having the same eccentric orientation whereby the eccentric unbalances of said groups combine to provide a reciprocating secondary shaking force in the crankshaft for balancing opposed secondary shaking forces of equivalent value acting on the crankshaft during engine operation.

6. The engine of claim 1 wherein said means for rotatably driving the balance weights comprises planetary gears connected with said weights and driven by only one of fixed external and internal gears, the connections of the planetary gears of one of said groups with their respective weights being through reversing gear trains.

7. The engine of claim 2 wherein all said balance weights are carried by a single section of said crankshaft intermediate two adjacent throws.

8. The engine of claim 6 wherein said balance weights are carried within at least two spaced sections of the crankshaft, each such section being located between two adjacent throws.

9. The engine of claim 7 or 8 wherein the number of pairs of said balance weights is two.

10. A multicylinder piston engine having a housing supporting a crankshaft rotatably journaled therein for rotation on a longitudinal axis, said crankshaft having a plurality of axially spaced throws associated with various engine cylinders, said crankshaft rotatably carrying a plurality of balance weights arranged for eccentric rotation about axes parallel with and spaced from the crankshaft axis, said balance weights comprising separate first and second groups of weights having mass and eccentricity selected to provide equivalent rotating forces for both groups when rotated at equal speeds, means for rotatably driving the balance weights of said first and second groups in opposite directions at twice crankshaft speed relative to said engine housing, the unbalance of said weights combining to provide a reciprocating secondary shaking force on said crankshaft for balancing opposed secondary shaking forces of equivalent value applied to the crankshaft during engine operation.

11. The engine of claim 10 wherein all said balance weights are carried by at least one section of the crankshaft, each said section being located between and exclusively journalled outwardly of two adjacent throws.

* * * * *